A. W. DRUMMOND & A. D. DAVENPORT.
SPRING WHEEL.
APPLICATION FILED SEPT. 13, 1911.

1,034,220. Patented July 30, 1912.

WITNESSES

INVENTORS
Arthur W. Drummond
Justin D. Davenport
BY
ATTORNEYS

UNITED STATES PATENT OFFICE.

ARTHUR WEED DRUMMOND AND AUSTIN DWIGHT DAVENPORT, OF GUSTINE, CALIFORNIA.

SPRING-WHEEL.

1,034,220.   Specification of Letters Patent.   Patented July 30, 1912.

Application filed September 13, 1911. Serial No. 649,094.

*To all whom it may concern:*

Be it known that we, ARTHUR W. DRUMMOND and AUSTIN D. DAVENPORT, citizens of the United States, and residents of Gustine, in the county of Merced and State of California, have invented a new and Improved Spring-Wheel, of which the following is a full, clear, and exact description.

Our invention is an improvement in wheels, so constructed that the rim is resiliently mounted with respect to the spokes and the hub, the object being to eliminate the jarring and jolting of the vehicle on which the wheel is mounted, when the same is in motion.

To this end our invention comprises a hub having a plurality of tubular spokes in which spring-actuated plungers are mounted, the plungers being pivotally connected at their outer ends each to a leaf spring connected at one end to the rim of the wheel and at the other end to the body of a spoke adjacent the spoke in which each plunger is mounted.

Reference is to be had to the accompanying drawings forming a part of this specification, in which the same characters of reference indicate the same parts in both the views.

Figure 1:
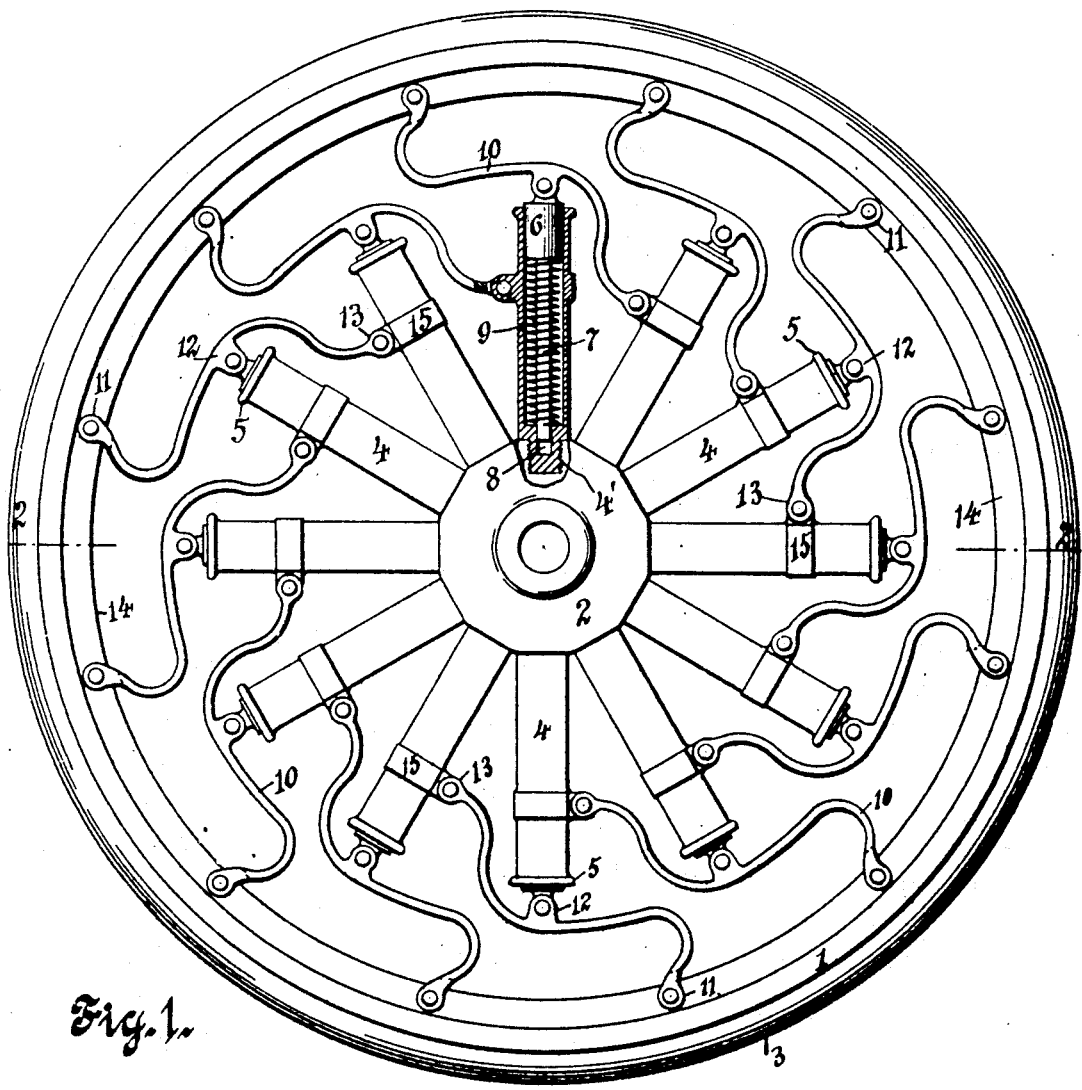
Figure 2:
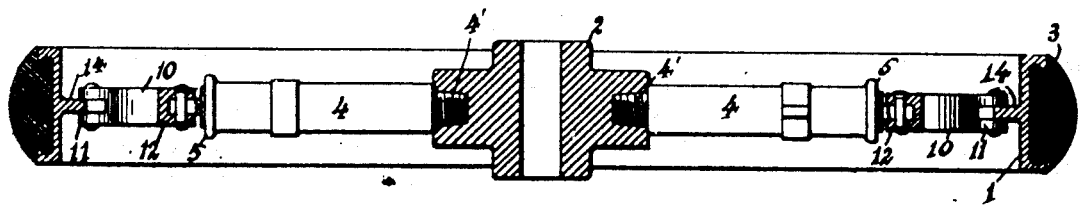

Figure 1 is a side elevation, partly in section, showing a wheel of our improved construction; and Fig. 2 is a horizontal section on the line 2—2 of Fig. 1.

On the drawings our improved wheel is shown as comprising a flanged rim 1, and a hub 2, the flanged rim 1 having secured thereto a resilient tire 3 of any preferred construction.

The numerals 4 indicate a plurality of tubular spokes having threaded bosses 4′ on their inner ends, which are screwed into suitable threaded sockets in the body of the hub to hold the tubular spokes in place. The outer end of each of these spokes is provided with an integral bead or flange 5, to strengthen the same and prevent the spokes from bursting or splitting; and each of the tubular spokes carries inside the same a sliding plunger 6 having a stem 7 which fits within a bore 8 formed at the inner end of the spokes 4. The plungers 6 are held in extended position by means of a spring 9, which engages with the rear face of the plunger 6 at one end, and seats against the inner end of the tubular spokes at the other.

10 are a plurality of leaf springs substantially S-shaped and having pairs of lugs 11, 12 and 13. The lugs 11 form a yoke at one end of each spring, and the lugs 13 form a yoke at the other end; while the lugs 12 are arranged in an intermediate position, and are pivotally connected to the plungers 6 by means of pins passing through apertures therein. The yokes 11 and 13 are likewise perforated to receive pivot pins connecting the lugs 11 to an annular rib 14 formed on the inside of the rim 1, and to connect the lugs 13 to a collar 15 having a projection received between the lugs 13, carried by each of the spokes 4.

From the above description it will be apparent that the weight of the part of the vehicle supported by the wheel will be distributed over the springs 10 arranged adjacent that portion of the wheel which is close to the ground. The springs 9 in the tubular spokes 4 coöperate with the springs 10, to keep the hub and the radiating spokes connected thereto centrally located with respect to the rim 1, and it will be apparent that the rim of the wheel can be moved in any direction to a certain extent with respect to the hub 2 along a line passing through the center of the hub. Owing to the elasticity of the springs 10 and 9, the jarring and jolting of the vehicle, due to the same striking obstructions in the roadbed when the vehicle is in motion, are deadened before they reach the vehicle body, and as a result the body of the vehicle runs smoothly, without inconvenience or discomfort to the occupants. It is to be further observed that, taking any one of the springs 10 in the lower half of the wheel shown in Fig. 1, the upward movement of the rim will not only bend the spring 10, but also tend to cause it to revolve around the pivot pin passing through the lugs 12, as an axis. Each spring 10 in the lower part of the wheel thus tends to exert a leverage action on the tubular spoke 4 to the left, the direction of this action being outward. In this way the inner end of each spring, that is to say, the end on which the lugs 13 are formed, assists the spoke 4 to which it is attached by means of the lugs 13, to resist the inward thrust which is exerted against the spoke by the action of the rim on the spring which is attached to the end of this spoke by means of the lugs 12. In consequence, we are enabled by means of this construction to obtain a very strong and efficient wheel, and at the same time make the parts comparatively lighter than would be otherwise required.

We wish to reserve to ourselves the right to make certain changes in the size and arrangement of the parts such as fairly fall within the scope and spirit of our invention.

Having thus described our invention, we claim as new and desire to secure by Letters Patent:

1. In a resilient wheel, the combination of a hub, a plurality of radiating spokes carried by the hub, and leaf springs arranged between the rim and the hub, the end of each of said spokes being connected to one of the said springs between the extremities of the same, and one end of each of said springs being connected to the rim and the other end being connected to another spoke at a point spaced from the outer end of the same.

2. In a resilient wheel, the combination of a rim having an internal annular rib, a hub carrying a plurality of tubular radiating spokes, each of said spokes having a collar thereon with a projecting lug, a plurality of leaf springs, each having pairs of lugs at its opposite ends, the lugs at one end being pivotally connected to the annular rib, and the lugs on the other to the projection on the said collar, and a plurality of spring-actuated plungers carried by said tubular spokes, said spring-actuated plungers being each pivotally connected to one of said leaf springs intermediate the ends thereof.

In testimony whereof we have signed our names to this specification in the presence of two subscribing witnesses.

ARTHUR WEED DRUMMOND.
AUSTIN DWIGHT DAVENPORT.

Witnesses:
SAMUEL H. GREENE,
CLARENCE W. PURRINGTON.

Copies of this patent may be obtained for five cents each, by addressing the "Commissioner of Patents, Washington, D. C."